United States Patent [19]

Bill et al.

[11] 4,336,276
[45] Jun. 22, 1982

[54] FULLY PLASMA-SPRAYED COMPLIANT BACKED CERAMIC TURBINE SEAL

[75] Inventors: Robert C. Bill, Rocky River; Donald W. Wisander, Columbia Station, both of Ohio

[73] Assignee: The United States of America as represented by the Administrator of the National Aeronautics and Space Administration, Washington, D.C.

[21] Appl. No.: 145,209

[22] Filed: Mar. 30, 1980

[51] Int. Cl.³ .............................................. B05D 1/08
[52] U.S. Cl. ..................................... 427/34; 415/174; 427/423
[58] Field of Search ................... 427/34, 423; 415/174

[56] References Cited

U.S. PATENT DOCUMENTS

| | | | |
|---|---|---|---|
| 3,817,719 | 6/1974 | Schilke et al. | 29/182.5 |
| 3,834,001 | 9/1974 | Carroll et al. | 29/414 |
| 3,879,831 | 4/1975 | Rigney et al. | 29/182.5 |
| 3,880,550 | 4/1975 | Corey et al. | 415/174 |
| 3,975,165 | 8/1976 | Elbert et al. | 29/182.2 |
| 4,080,204 | 3/1978 | Panzera | 75/229 |
| 4,135,851 | 1/1979 | Bill et al. | 415/174 |
| 4,207,024 | 6/1980 | Bill et al. | 415/174 |
| 4,247,249 | 1/1981 | Siemers | 415/174 |
| 4,251,272 | 2/1981 | Sara | 75/200 |
| 4,273,824 | 6/1981 | McComas et al. | 428/256 |

*Primary Examiner*—John H. Newsome
*Attorney, Agent, or Firm*—Norman T. Musial; John R. Manning; Gene E. Shook

[57] ABSTRACT

This invention is concerned with a seal having a high temperature abradable lining material encircling the tips of turbine blades in turbomachinery. The invention is particularly directed to maintaining the minimum operating clearances between the blade tips and the lining of a high pressure turbine.

A low temperature easily decomposable material, such as a polymer, in powder form is blended with a high temperature oxidation resistant metal powder. The two materials are simultaneously deposited on a substrate formed by the turbine casing. Alternately, the polymer-powder may be added to the metal powder during plasma spraying.

A ceramic layer is then deposited directly onto the metal-polymer composite. The polymer additive mixed with the metal is then completely volatilized to provide a porous layer between the ceramic layer and the substrate.

Thermal stresses are reduced by virtue of the resulting porous structure which affords a cushion effect. By using only plasma spraying for depositing both the powders of the metal and polymer material, as well as the ceramic powder, no brazing is required.

7 Claims, 1 Drawing Figure

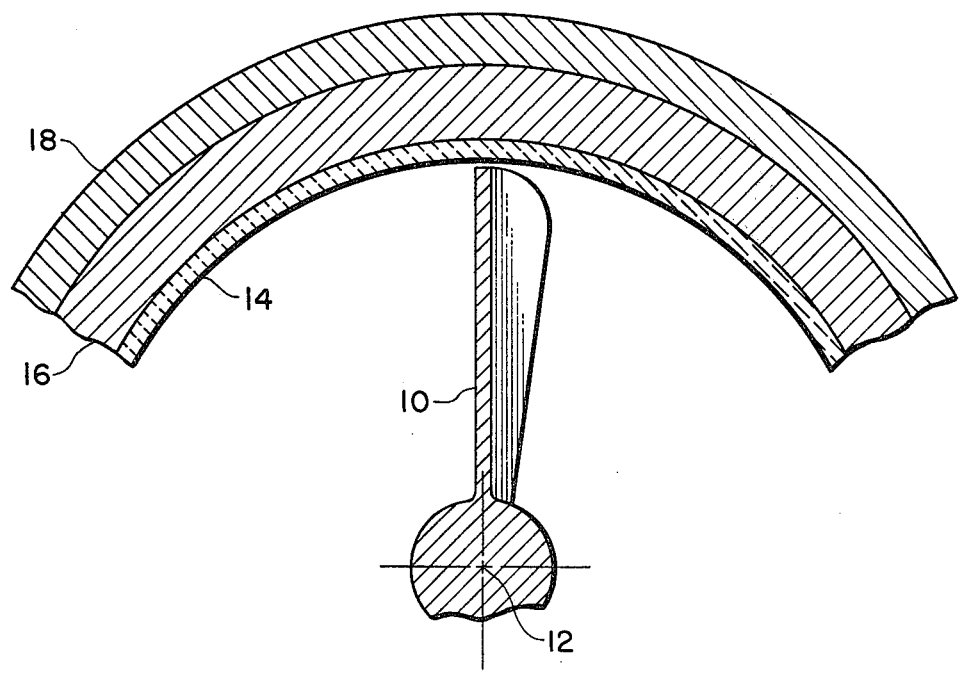

FULLY PLASMA-SPRAYED COMPLIANT BACKED CERAMIC TURBINE SEAL

DESCRIPTION

ORIGIN OF THE INVENTION

The invention described herein was made by employees of the U.S. Government and may be manufactured and used by or for the Government for governmental purposes without the payment of any royalties thereon or therefor.

TECHNICAL FIELD

This invention is directed to a high temperature abradable lining material for over the tips of high pressure turbine blades. Such a structure provides for the operation at and maintenance of minimum clearances between the blade tips and the abradable lining during operation of the turbine.

Close tolerances between the tips of the blades and the surrounding shroud or casing in turbines or compressors reduces the return flow of fluid from the high pressure side to the low pressure side. The closer the shroud surrounds the tips of the blades, the more efficient is the turbine or compressor. Aerodynamic losses are also reduced by closer fitting of the blade tips to the shroud.

Clearance dimensions are dynamic in that they change with temperature together with mechanical and aerodynamic forces. The clearance may decrease, for example, in one direction, under shock loading, when an aircraft makes a sudden maneuver that subjects the parts to unusual acceleration forces, causes a differential expansion or movement of the parts.

BACKGROUND ART

U.S. Pat. No. 4,135,851 to R. C. Bill and L. P. Ludwig discloses several seals using various compliant backing materials, including a low density sintered metal, which effectively reduce operating thermal stresses during steady operating conditions and transient thermal conditions. Because of the open porosity of sintered metals, oxidation of the metal does not lead to swelling and distortion. However, brazed bonding attachments are required with the sintered metal backings.

U.S. Pat. No. 4,075,364 to Panzera describes various methods for securing a ceramic layer to a low modulus structure. Elbert et al U.S. Pat. No. 3,975,165 is directed to a graded metal-to-ceramic abradable seal which is produced by laying up layers in wet paste form and then drying.

Graded metal ceramic layers have also been applied by plasma spray deposition. The problems encountered with graded coatings are discussed in column 1 of U.S. Pat. No. 4,055,705 to Stecura et al.

DISCLOSURE OF INVENTION

The seal structure of the present invention utilizes a ceramic material which is abradable. The ceramic material is backed by porous material that functions on the same principle as a low modulus sintered pad in that it reduces thermal stresses and affords a cushion effect. A low temperature easily decomposible material in powder form is deposited in combination with a high temperature oxidation resistant metal powder onto a dense metal substrate formed by the turbine casing. These powders are preferably deposited by plasma spraying.

A ceramic layer is then applied by plasma spray deposition directly onto the metal-decomposible material composite. The decomposible additive in the composite is volatilized either by direct heating or by the operation of the turbomachinery, thereby producing the desired porosity.

This process eliminates the brazing step of the prior art. The single-step plasma spray fabrication process for the entire seal system is less costly, and it provides for increased flexibility with respect to material composition.

BRIEF DESCRIPTION OF THE FIGURE

The details of the invention will be described in connection with the accompanying FIGURE which is a schematic view, in transverse cross section, of an arrangement for a turbine or compressor embodying the invention.

BEST MODE FOR CARRYING OUT THE INVENTION

Referring to the FIGURE, a rotor blade 10 of a turbine compressor, for example, rotates about an axis 12 in a counter-clockwise direction, tending to force the fluid in which it operates in a direction into the paper. A shroud 14 surrounds the blade 10 and is substantially concentric with the axis 12. The shroud 14 is of a suitable ceramic material that is abradable relative to the material of the blade 10.

A compliant backing 16 surrounds the shroud 14. The backing 16 is of a porous material that reduces thermal stresses by virtue of its low elastic modulus which affords a cushion effect.

According to the present invention powders of a material that is easily decomposable at low temperatures are added to high temperature oxidation resistant metal powders. These powders are then simultaneously deposited onto a dense metal substrate formed by the casing 18 of the turbine. Plasma spraying is used to deposit these powders.

A polymeric powder for example, polyester, is used for the low temperature easily decomposable material in the preferred embodiment. It is contemplated that hollow glass or ceramic spheres also may be deposited with the high temperature oxidation resistant metal powders to achieve the desired porosity.

The oxidation resistant metal powders of the preferred embodiment are of a Ni-16Cr-6 Al-0.6Y composition. It is further contemplated that other powder material of the MCrAlY type may be utilized for the high temperature material. Such MCrAlY material includes NiCrAlY, CoCrAlY, and FeCrAlY.

A bond coating is then applied to the metal-polymer composite by plasma spray deposition. This bond coating is the same material as the metal component of the metal-polymer composite and is plasma sprayed to a nominal thickness of about 0.002 inch.

A ceramic layer is then applied by plasma spray deposition directly onto the bond coating. Satisfactory results have been obtained by using yttria stabilized zirconia for the ceramic layer material.

The system is then heat treated at about 1,000° F. to completely volatilize the polymer additive mixed with the metal. This volatilization also may be achieved during operation of the turbomachinery. For satisfactory results a uniformly distributed 50 volume percent porosity is required.

It has been found that 20 to 22 weight percent polymer powders (60–65 volume percent) must be added to the NiCrAlY powders to achieve the 50 volume percent porosity in the porous low density, low modulus thermal strain absorbing layer. It was further found that the spray conditions must be those employed for NiCrAlY alone in order to achieve the desired uniformly distributed 50 volume percent porosity.

It has been further discovered that the NiCrAlY-polymer mix must be applied to a thickness of not less than 0.060 inch in order to be effective in reducing the incidence of thermal shock failure and spallating of the ceramic layer. The sprayed porous, low modulus thermal strain absorbing layer functions on the same principle as the prior art low modulus sintered pad by reducing thermal stresses because of its porous structure which affords a cushion effect. However, no brazing is required.

While the invention has been described and illustrated with reference to certain preferred embodiments thereof, those skilled in the art will appreciate that various modifications, changes, omissions and substitutions may be made without departing from the spirit of the invention. It is intended, therefore, that the invention will be limited only by the scope of the subjoined claims.

We claim:

1. A method of making a seal comprising the steps of providing a substrate of a dense metal,
    simultaneously depositing a material that is easily decomposable at low temperatures and a high temperature oxidation-resistant metal onto said substrate to form a composite,
    applying a metal bond coating onto said composite,
    applying a ceramic layer onto said bond coating, and
    heating the resulting system to volatilize the decomposable material in said composite.

2. A method of making a seal as claimed in claim 1 wherein the decomposable material and the oxidation resistant material are deposited by plasma spraying.

3. A method of making a seal as claimed in claim 2 wherein powders of the materials are plasma sprayed onto the substrate.

4. A method of making a seal as claimed in claim 3 wherein the decomposable material and the oxidation resistant metal are blended by mixing said powders of these materials.

5. A method of making a seal as claimed in claim 4 wherein polyester powders are blended with MCrAlY powders and deposited on the substrate to form the composite.

6. A method of making a seal as claimed in claim 1 wherein a ceramic layer of yttria stabilized zirconia is applied to the bond coating plasma spray deposition.

7. A method of making a seal as claimed in claim 1 wherein the system is heated to a temperature of about 1000° F. to volatilize the decomposable material.

* * * * *